United States Patent
Ellis et al.

(10) Patent No.: US 6,321,960 B1
(45) Date of Patent: Nov. 27, 2001

(54) DASHBOARD RAIL AND STEERING COLUMN SUPPORT

(75) Inventors: Michael Gousotti Ellis, Plymouth; Thomas Scott, Bloomfield Hills, both of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/711,974

(22) Filed: Nov. 14, 2000

Related U.S. Application Data
(60) Provisional application No. 60/175,325, filed on Jan. 10, 2000.

(51) Int. Cl.[7] .................................................. B60R 7/06
(52) U.S. Cl. ................................................ 224/274; 224/483
(58) Field of Search .............................. 224/274, 483, 224/542, 548, 554, 558, 570, 926; 280/779; 296/1.1, 71

(56) References Cited

U.S. PATENT DOCUMENTS

| | | | |
|---|---|---|---|
| 1,230,245 | * 6/1917 | Walker ................................ 280/779 |
| 1,460,760 | * 7/1923 | McGee .............................. 248/298.1 |
| 1,498,567 | * 6/1924 | Onderdonk ......................... 280/779 |
| 1,688,148 | * 10/1928 | Martin ............................. 248/229.12 |
| 1,688,765 | * 10/1928 | Veras .................................. 248/103 |
| 1,730,790 | * 10/1929 | Squires ................................. 40/644 |
| 2,580,985 | * 1/1952 | Wooden ............................... 224/558 |
| 3,062,422 | * 11/1962 | Lord ................................. 206/315.1 |
| 4,353,588 | * 10/1982 | Giugiaro et al. .................... 296/37.1 |
| 4,362,319 | * 12/1982 | Masaki et al. ...................... 280/779 |
| 4,432,565 | 2/1984 | Suzuki et al. ....................... 280/779 |
| 4,671,536 | 6/1987 | Yoshimura .......................... 280/779 |
| 5,238,286 | * 8/1993 | Tanaka et al. ........................ 296/70 |
| 5,282,637 | 2/1994 | McCreadie .......................... 296/203 |
| 5,387,010 | * 2/1995 | Mohr .................................... 281/43 |
| 5,782,136 | * 7/1998 | Witkovsky et al. ................... 74/492 |
| 5,868,426 | * 2/1999 | Edwards et al. ..................... 280/779 |
| 6,237,954 | * 5/2001 | Sato et al. ........................... 280/775 |

* cited by examiner

Primary Examiner—Joseph D. Pape
Assistant Examiner—Paul Chenevert
(74) Attorney, Agent, or Firm—Damian Porcari

(57) ABSTRACT

A dashboard attachment system for a specialty vehicle is described. A rail having first and second ribs located on front and rear edges thereof that are separated by a center portion of reduced thickness. A C-shaped mounting clip forms part of an accessory such as a bag hook, mirror, or cup holder that are secured by the C-shaped mounting clip to one of the ribs. A steering column support bracket including a C-shaped clip and a tubular receptacle for a steering column is provided. The rail is supported by rail supports that are anchored to the dashboard. The rail is finished by right and left end caps that have U-shaped rib interconnecting the first and second ribs on opposite lateral ends of the rail.

14 Claims, 3 Drawing Sheets

DASHBOARD RAIL AND STEERING COLUMN SUPPORT

CROSS-REFERENCE TO RELATED APPLICATIONS

This application claims the benefit of U.S. provisional application Ser. No. 60/175,325, filed Jan. 10, 2000.

TECHNICAL FIELD

The present invention relates to a dashboard rail and steering column support for a vehicle.

BACKGROUND ART

Specialty vehicles such as golf carts and utility vehicles are used for a wide variety of purposes. Such vehicles are generally smaller than normal motor vehicles. Due to the small size of such vehicles, the quantity of usable storage space and accessability of vehicle interior components are limited.

Consumers of such vehicles are interested in vehicles that have storage facilities and vehicle interior components that are within easy reach. Cup holders, storage devices, mirrors, picture frames and dashboard display modules are formed as part of a complex dashboard structure in an inflexible design. Such inflexible designs limit the ability of consumers to customize vehicle interiors.

To maximize the range of electric specialty vehicles, it is imperative that vehicles be designed to minimize weight. In prior art specialty vehicles, it is generally necessary to provide cross vehicle reinforcing bars and a steering column support that are generally independent of the dashboard. The need to provide a separate steering column support and a cross vehicle support tends to add weight to a vehicle.

In designing specialty vehicles, cost constraints must be addressed by providing economical manufacturing techniques. To this end, it is advantageous to provide multipurpose parts that combine the functionality of several different components in a single flexible system. The need to provide a cross vehicle support, a steering column support, and flexible accessory mounting members are objectives that are not adequately addressed in prior art specialty vehicles.

These and other disadvantages and shortcomings of the prior art are addressed by applicants' invention as summarized below.

DISCLOSURE OF INVENTION

According to the present invention, a dashboard attachment system for a vehicle is disclosed. The system includes a transversely extending rail having first and second ribs extending along the length of the rail on a front edge and a rear edge of the rail. At least one accessory having a C-shaped mounting bracket is adapted to engage one of the ribs for supporting accessories on the rail.

According to the invention, by way of example, the accessories may be cup holders, bag hooks, mirrors, picture frames, or instrument panel display modules. It should be understood that more than one accessory may be attached to the rail and that it is anticipated that several different types of accessories may be mounted in various ways on the rail.

The present invention also relates to a dashboard attachment system wherein the vehicle includes a steering column supporting a steering wheel. The steering column is partially supported by the rail. A bracket having a C-shaped mounting clip on an upper end and a tubular steering column receptacle on a lower end of the bracket is provided for receiving the steering column. The C-shaped mounting clip on the upper end of the bracket may be secured to the first rib on the front edge of the rail.

According to another aspect of the invention, a plurality of supports are secured to the vehicle at a first end of the supports. The supports also have a C-shaped mounting clip on a second end that engage a rib of the rail.

According to yet another aspect of the invention, right and left end caps are secured to right and left sides of the rail. Each end cap has a U-shaped rib that connects the first and second ribs on the front and rear edges of the rail.

These and other objects and advantages of the present invention will be better understood in view of the attached drawings and following detailed description of the best mode of practicing the invention.

BEST MODE FOR CARRYING OUT THE INVENTION

Figure 1:
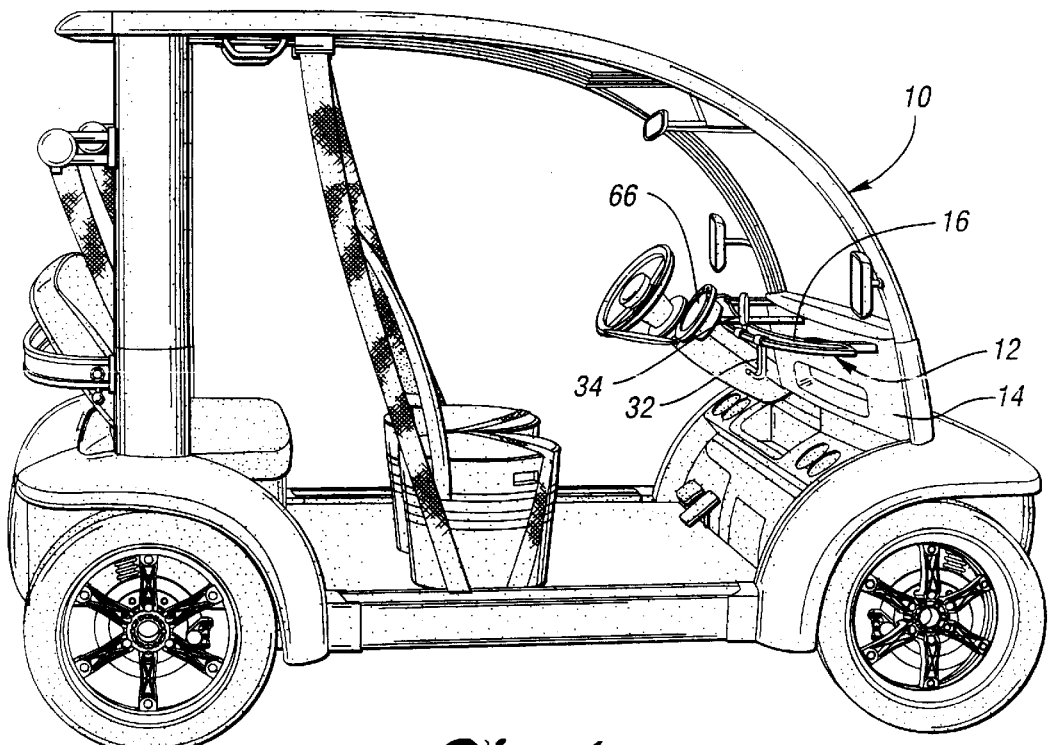
FIG. 1 is a right side perspective view of a specialty vehicle having the dashboard attachment system of the present invention.
Figure 2:
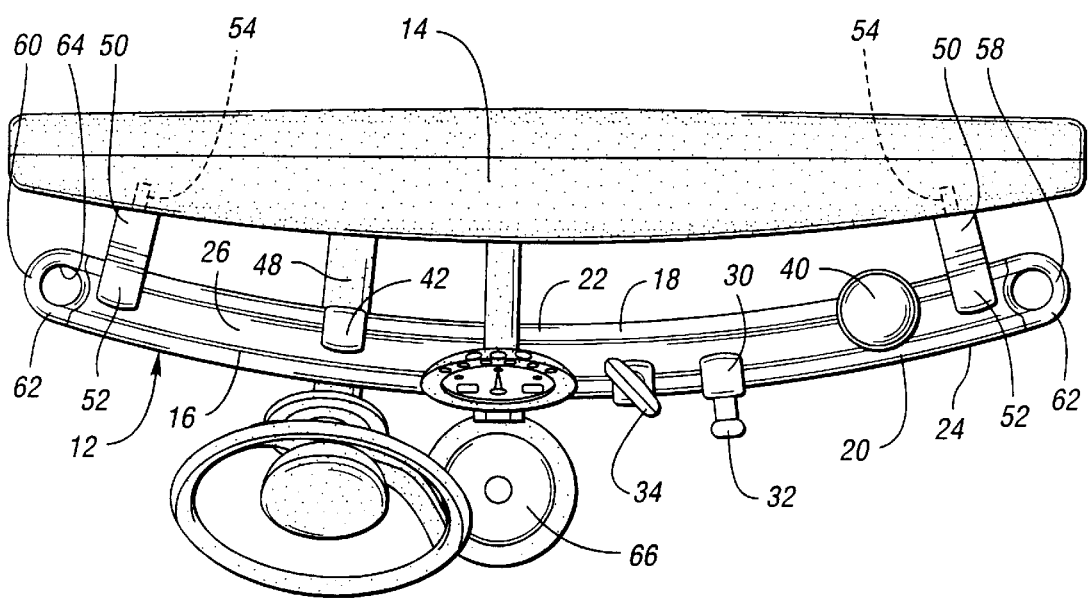
FIG. 2 is a top plan view of the dashboard attachment system.

Referring now to FIGS. 1 and 2, a specialty vehicle as generally referred to by reference numeral 10 is shown to include a dashboard attachment system generally indicated by reference numeral 12. The specialty vehicle 10 has a dashboard 14 to which the dashboard attachment system 12 is secured. The dashboard attachment system 12 includes a rail 16 having a first rib 18 and a second rib 20 located on the front edge 22 and rear edge 24, respectively. A central portion 26 of reduced thickness extends between the first and second ribs 18, 20.

A C-shaped mounting clip 30 is used to attach accessories such as a bag hook 32, mirror, or a picture frame 34 to the rail 18. The C-shaped mounting clip 30 partially encircles one of either the first rib 16 or second rib 20. The C-shaped mounting clip 30 must be relatively resilient so that it may be snapped over one of the ribs 18, 20 to exert a gripping force that holds the accessory in place on the rail 16. The C-shaped mounting clips may be laterally repositioned on the rail or removed as desired by vehicle occupants.

Figure 3:
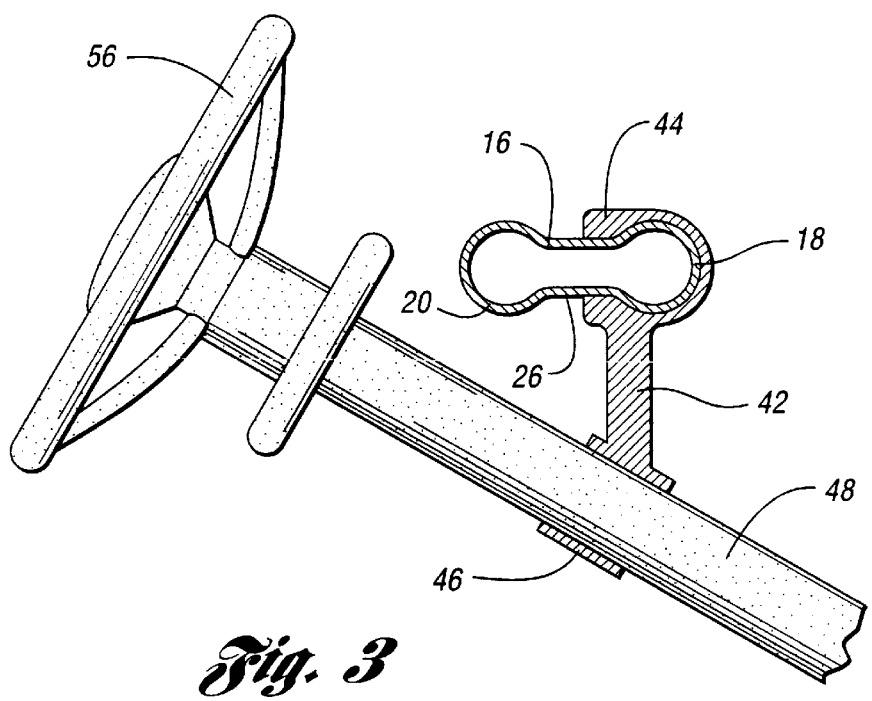
FIG. 3 is a fragmentary partial cross-section view of a steering column support bracket and steering column.

Referring now to FIG. 3, a steering column support bracket 42 includes a C-shaped clip 44 on an upper end of the steering column support bracket 42 and a tubular receptacle 46 on the lower end of the bracket 42. A steering column 48 supporting a steering wheel 56 is shown received in the tubular receptacle 46. The C-shaped clip 44 is shown engaging the first rib 18 of the rail 16.

Figure 4:
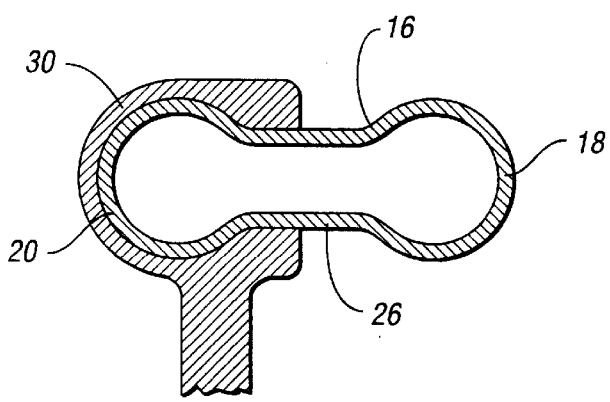
FIG. 4 is a fragmentary cross-sectional view of a C-shaped mounting bracket engaging the rail.

Referring now to FIG. 4, the accessory mounting arrangement is shown wherein a C-shaped mounting clip 30 is shown engaging one of the ribs 18, 20. The C-shaped mounting clip 30 extends partially across the central portion 26.

Figure 5:
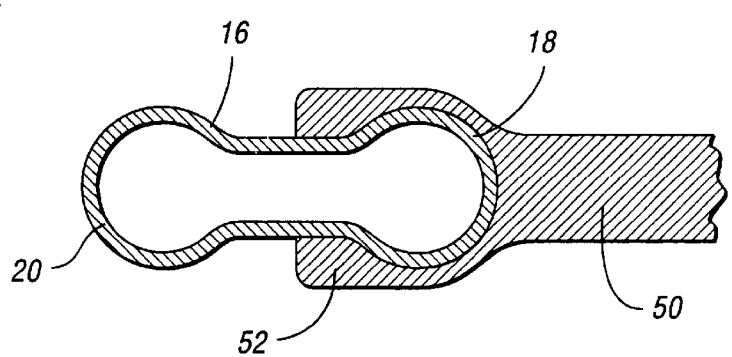
FIG. 5 is a fragmentary cross-sectional view of a support having a C-shaped mounting clip engaging the rail.

Referring now to FIG. 5, a rail support 50 is shown to include a C-shaped clip 52 that is received on the first rib 18 of the rail 16.

Figure 6:
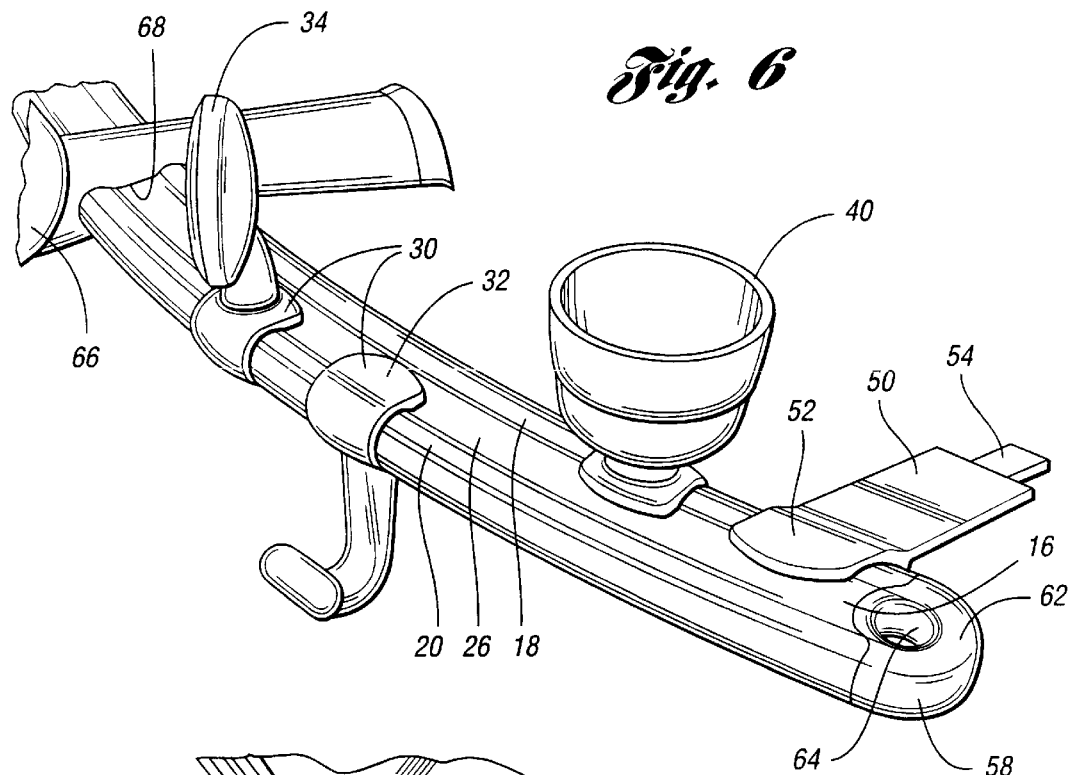
FIG. 6 is a fragmentary perspective view of the dashboard attachment system of the present invention showing a picture frame, bag clip, and cup holder attached to the rail.

Referring now to FIG. 6, an anchor 54 is provided on the front end of the rail support 50. Anchor 54 is adapted to be secured to the dashboard 14.

Figure 7:
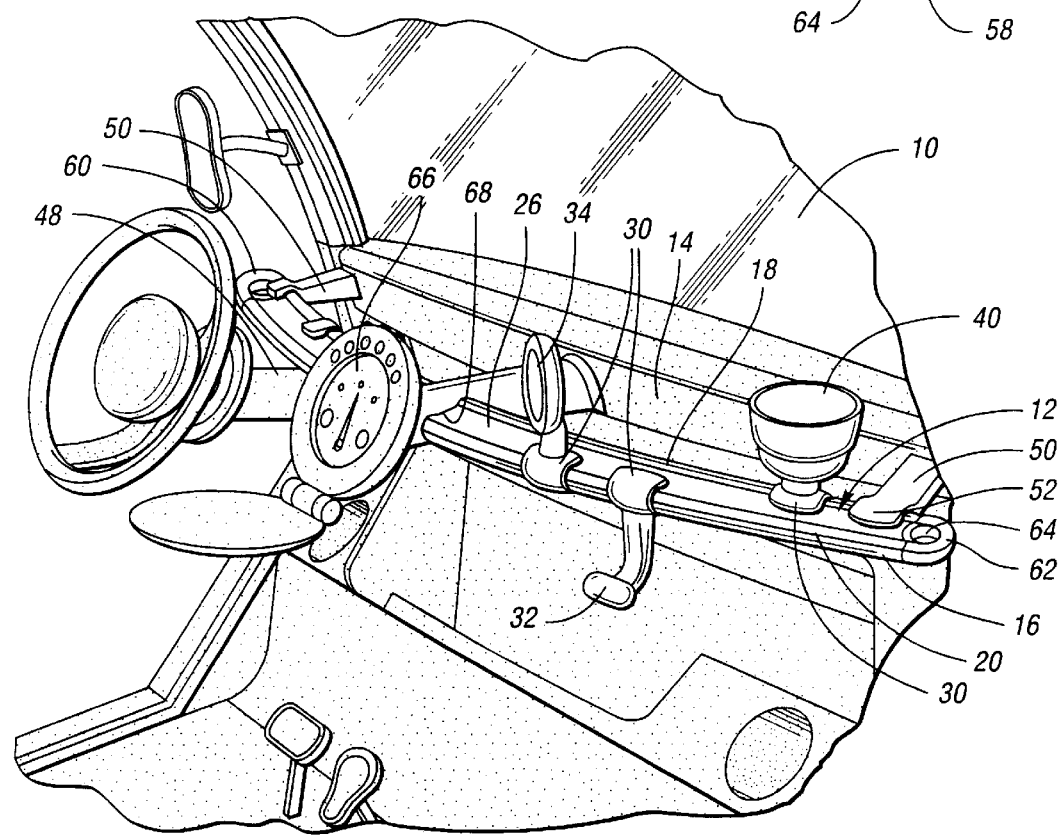
FIG. 7 is a fragmentary perspective view of the dashboard attachment system of the present invention shown installed in a specialty vehicle.

Referring now to FIGS. 2, 6, and 7, a right end cap 58 and left end cap 60 are provided on opposite lateral ends of the rail 16. Each end cap includes a U-shaped rib 62 that is aligned with the first and second ribs 18, 20. Each end cap 58 defines a circular opening 64 inside the U-shaped rib 62. The end caps 58, 60 may be used to support side view mirrors (not shown), if desired.

An instrument panel display module 66 is secured to the rail 16 with the rail 16 being received in a contoured opening 68. The contoured opening is shaped to receive the rail 16.

The rail 16 is preferably a curved aluminum extrusion. The C-shaped mounting clips 30, 44, and 52 are preferably formed of a strong resilient molded polymeric material. The C-shaped mounting clips may be formed of the same molded polymeric material that is used to form the accessories such as a bag hook 32, mirror 34, or cup holder 40.

While the best mode for carrying out the invention has been described in detail, those familiar with the art to which this invention relates will recognize various alternative designs and embodiments for practicing the invention as defined by the following claims.

What is claimed is:

1. A dashboard attachment system for a vehicle comprising:
    a transversely extending rail having first and second ribs extending along the length of the rail on a front edge and rear edge, respectively, a central portion of reduced thickness being provided between the first and second ribs; and
    at least one accessory having a C-shaped mounting bracket partially encircling one of the ribs and extending into the central portion for supporting the accessory on the rail.

2. The system of claim 1 wherein the accessory is a cup holder.

3. The system of claim 1 wherein the accessory is a bag hook.

4. The system of claim 1 wherein the accessory is a picture frame.

5. The system of claim 1 wherein the accessory is an instrument panel display module.

6. The system of claim 1 further comprising a steering column supporting a steering wheel, the steering column being supported, in part, by a bracket attached to the rail.

7. The system of claim 6 wherein the bracket supporting the rail has a C-shaped mounting clip on an upper end of the bracket and a tubular receptacle on a lower end of the bracket for receiving the steering column, the C-shaped mounting clip being secured to the first rib on the front edge of the rail.

8. The system of claim 1 further comprising a plurality of supports secured to the vehicle at a first end of the supports and having a C-shaped mounting clip on a second end of the supports that engage the first rib of the rail.

9. The system of claim 1 wherein the rail is an aluminum extrusion.

10. The system of claim 1 wherein the accessory is an injection molded member.

11. The system of claim 1 further comprising right and left end caps secured to right and left sides of the rail, each end cap having a U-shaped rib that connects the first and second ribs on the front and rear edges of the rail.

12. A dashboard attachment system for a vehicle comprising:
    a transversely extending rail having first and second ribs extending along the length of the rail on a front edge and rear edge, respectively;
    at least one accessory having a C-shaped mounting bracket engaging one of the ribs for supporting the accessory on the rail; and
    a steering column supporting a steering wheel, the steering column being supported, in part, by a bracket attached to the rail, wherein the bracket supporting the rail has a C-shaped mounting clip on an upper end of the bracket and a tubular receptacle on a lower end of the bracket for receiving the steering column, the C-shaped mounting clip being secured to the second rib on the rear edge of the rail.

13. A dashboard attachment system for a vehicle comprising:
    a transversely extending rail having first and second ribs extending along the length of the rail on a front edge and rear edge, respectively;
    at least one accessory having a C-shaped mounting bracket engaging one of the ribs for supporting the accessory on the rail; and
    a plurality of supports secured to the vehicle at a first end of the supports and having a C-shaped mounting clip on a second end of the supports that engage the first rib of the rail.

14. A dashboard attachment system for a vehicle comprising:
    a transversely extending rail having first and second ribs extending along the length of the rail on a front edge and rear edge, respectively;
    at least one accessory having a C-shaped mounting bracket engaging one of the ribs for supporting the accessory on the rail; and
    right and left end caps secured to right and left sides of the rail, each end cap having a U-shaped rib that connects the first and second ribs on the front and rear edges of the rail.

* * * * *